United States Patent
Kubo et al.

(10) Patent No.: US 10,012,294 B2
(45) Date of Patent: Jul. 3, 2018

(54) GEAR DRIVE DEVICE

(71) Applicant: KABUSHIKI KAISHA TOKAI RIKA DENKI SEISAKUSHO, Aichi (JP)

(72) Inventors: Yuki Kubo, Aichi (JP); Seiji Ishigaki, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 15/459,710

(22) Filed: Mar. 15, 2017

(65) Prior Publication Data

US 2017/0276218 A1   Sep. 28, 2017

(30) Foreign Application Priority Data

Mar. 23, 2016  (JP) ................. 2016-058378

(51) Int. Cl.
- *F16H 55/17* (2006.01)
- *F16H 19/00* (2006.01)
- *F16H 55/06* (2006.01)
- *F16H 57/023* (2012.01)
- *F16H 57/00* (2012.01)

(52) U.S. Cl.
CPC ........... *F16H 19/001* (2013.01); *F16H 55/06* (2013.01); *F16H 55/17* (2013.01); *F16H 57/023* (2013.01); *F16H 2019/008* (2013.01); *F16H 2057/0056* (2013.01)

(58) Field of Classification Search
CPC ........ F16H 19/001; F16H 55/06; F16H 55/17; F16H 2019/008

See application file for complete search history.

(56) References Cited

U.S. PATENT DOCUMENTS

| | | | |
|---|---|---|---|
| 4,722,239 A | 2/1988 | Fleck et al. | |
| 4,877,185 A * | 10/1989 | Kufrin | B05B 3/044 239/242 |
| 4,911,268 A * | 3/1990 | Kulpa | F03G 1/08 185/37 |
| 2001/0021330 A1 | 9/2001 | Kishida et al. | |

(Continued)

FOREIGN PATENT DOCUMENTS

DE  102007016019 B3  9/2008
EP  2302261 A1  3/2011

(Continued)

OTHER PUBLICATIONS

Office Action issued in the corresponding Japanese application No. 2016-058378 dated Feb. 28, 2017.

(Continued)

*Primary Examiner* — Jake Cook
(74) *Attorney, Agent, or Firm* — Roberts Mlotkowski Safran Cole & Calderon P.C.

(57) ABSTRACT

A gear drive device includes a first gear, and a second gear that meshes with the first gear to allow torque transmission. At least one of the first gear and the second gear includes a fan-type gear. The first gear and the second gear each include a guide portion, and the guide portion is configured to position the first gear and the second gear in a gear rotation direction upon installation thereof.

5 Claims, 4 Drawing Sheets

(56) References Cited

U.S. PATENT DOCUMENTS

2006/0191364 A1* 8/2006 Linke .................... F02D 11/107
                                                        74/411
2008/0067029 A1* 3/2008 Garrick .................. F02D 9/107
                                                        192/215
2016/0341331 A1* 11/2016 Lueders ................ F16K 11/165

FOREIGN PATENT DOCUMENTS

| JP | 10-211748 A | 8/1998 |
| JP | 2009002422 | 1/2009 |
| JP | 2014-233452 A | 12/2014 |

OTHER PUBLICATIONS

European Application No. 17162455.4-1762 Extended Search report dated Aug. 14, 2017.

* cited by examiner

GEAR DRIVE DEVICE

The present application is based on Japanese patent application No. 2016-058378 filed on Mar. 23, 2016, the entire contents of which are incorporated herein by reference.

TECHNICAL FIELD

The present invention relates to a gear drive device.

BACKGROUND ART

A gear drive device is known that enables improved workability of the positioning operation when the device is required to be installed with a meshing position of a second gear with a first gear at a predetermined phase (see for example Patent Document 1).

The gear drive device described in Patent Document 1 includes jigs extending beside and parallel to a first shaft and a second shaft of a back case. Inserting the jigs through positioning holes and the like and installing (supporting) the gears in order on the first shaft and the second shaft allows the rotational positions (phase, mesh position) of the gears to be fixed with respect to the back case. In other words, the jigs can be inserted at the same time as the first shaft and the second shaft are inserted through the gears, which makes it possible to perform installation and positioning operations at the same time, allowing workability to be improved.

CITATION LIST

Patent Document

Patent Document 1: Japanese Unexamined Patent Application Publication No. 2014-233452A

SUMMARY OF INVENTION

Technical Problem

However, in the gear drive device of Patent Document 1, the jig is required to be inserted in the positioning holes as the gears are installed in order and to be removed from the positioning holes after installation. Additionally, there is no method for positioning gears relative to other gears. As a result, the tooth tips of gears may come into contact with one another upon installation resulting in problematic cutting of the teeth and the like.

It is an object of the present invention to provide a gear drive device that allows the gears to be installed at a discretionary gear mesh position without tooth tips coming into contact with one another.

Solution to Problem

[1] According to an embodiment of the invention, a gear drive device comprises:
 a first gear; and
 a second gear that meshes with the first gear to allow torque transmission,
 wherein at least one of the first gear and the second gear comprises a fan-type gear,
 wherein the first gear and the second gear each comprise a guide portion, and wherein the guide portion is configured to position the first gear and the second gear in a gear rotation direction upon installation thereof.

[2] The gear drive device according to [1] may be configured such that the guide portion is disposed separately from a tooth portion of the first gear and the second gear.

[3] The gear drive device according to [2] may be configured such that the guide portion contacts with one another at a position spaced apart from the tooth portion in a tooth width direction.

[4] The gear drive device according to any one of [1] to [3] may be configured such that the guide portion of at least one of the first gear and the second gear protrudes from a tooth tip.

[5] The gear drive device according to any one of [1] to [4] may be configured such that the guide portion functions to determine an initial position in the gear rotation direction of the first gear and the second gear after the installation.

[6] The gear drive device according to [5] may be configured such that it further comprises an attachment base, wherein the initial position is determined by contacting the guide portion with a surface of the attachment base.

[7] The gear drive device according to [6] may be configured such that it further comprises a spring that is configured to bias the first gear or the second gear in the gear rotation direction, wherein the guide portion is contacted with the surface of the attachment base by a biasing force of the spring.

Advantageous Effects of Invention

According to the present invention, provided is the gear drive device in which the gears can be installed at any desired gear mesh position without their tooth tips coming into contact with one another.

DESCRIPTION OF EMBODIMENTS

Figure 1:
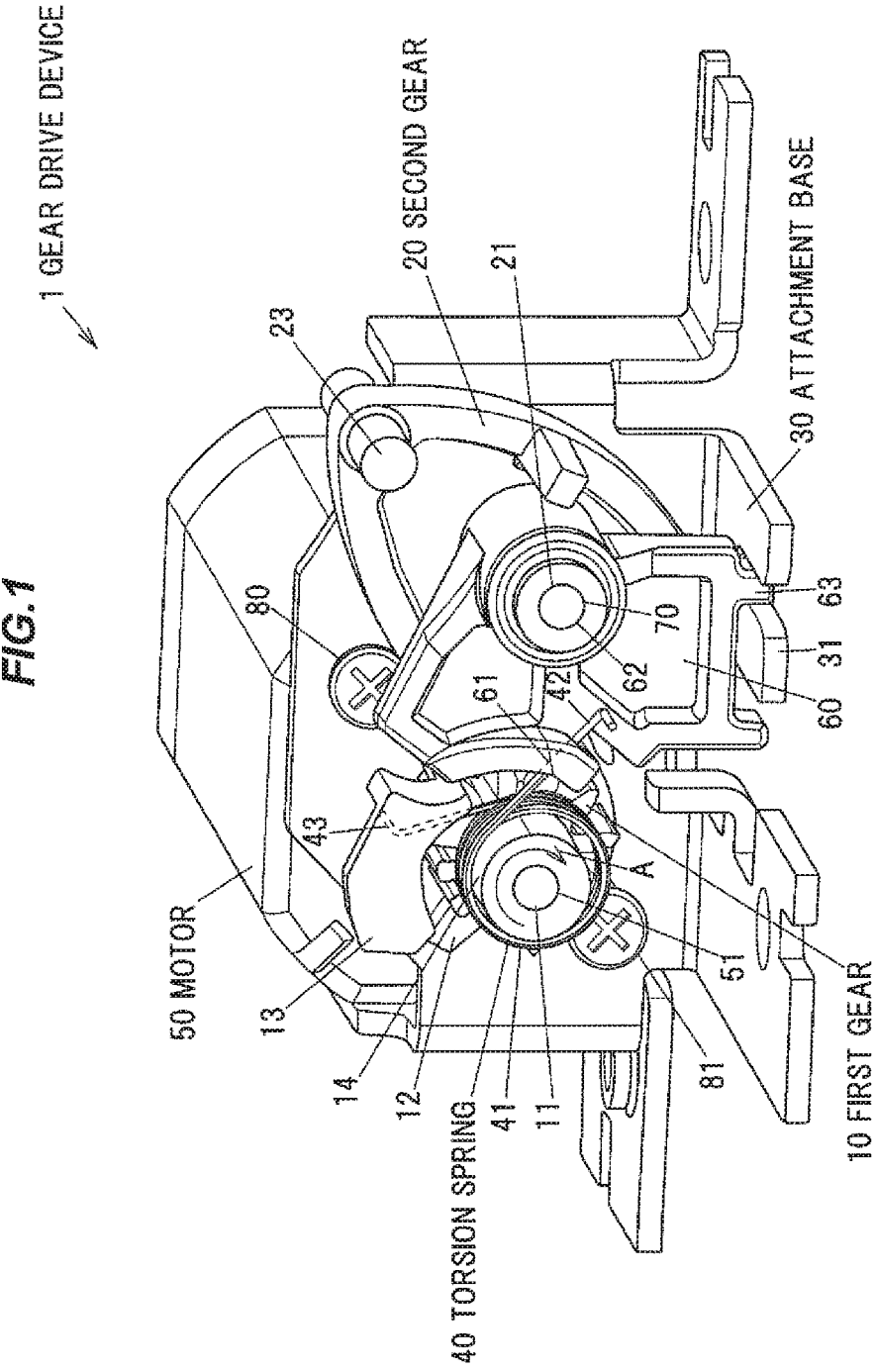
FIG. 1 is a three-dimensional schematic perspective view of a gear drive device according to an embodiment of the present invention.
Figure 2:
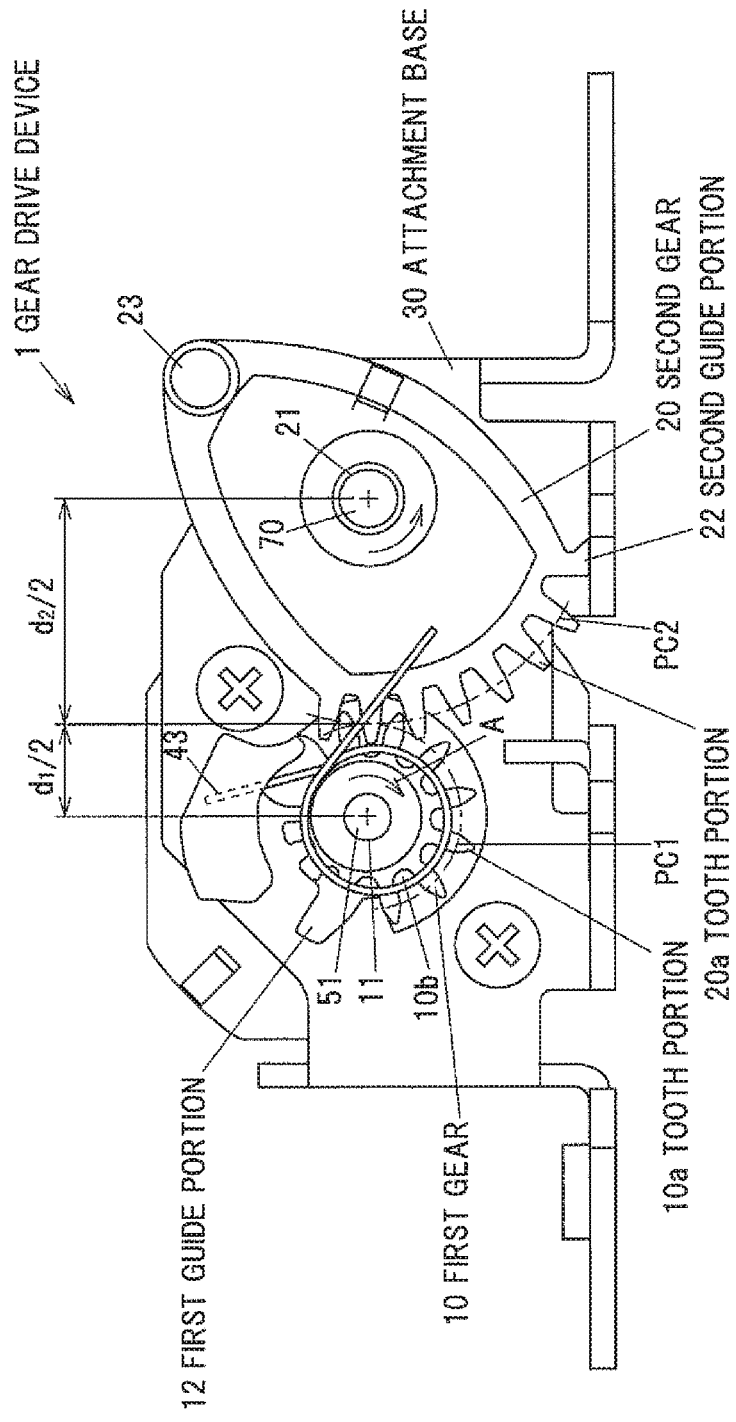
FIG. 2 is a front view of the gear drive device according to the embodiment of the present invention as seen from a gear rotation axis direction.

FIG. 1 is a three-dimensional schematic perspective view of a gear drive device according to an embodiment of the present invention. FIG. 2 is a front view of the gear drive device according to the embodiment of the present invention as seen from a gear rotation axis direction. Below, preferred embodiments of the present invention are described in detail while referencing the drawings.

EMBODIMENTS OF PRESENT INVENTION

Overall Configuration of Gear Drive Device 1

The gear drive device 1 according to the present embodiment includes a first gear 10 and a second gear 20 in mesh with the first gear 10 to allow torque transmission. The first gear 10 and/or the second gear 20 are a fan-type gear. The first gear 10 and the second gear 20 include guide portions 12, 22, respectively, that rotate in the gear rotation direction upon installation.

First Gear 10

The first gear 10, as illustrated in FIGS. 1 and 2 is a spur gear and is made of resin, such as polyoxymethylene (POM) also called polyacetal, for example. The first gear 10, as illustrated in FIG. 2, is a fan-type gear that includes tooth portions (projecting portions of the teeth) 10a only around a predetermined range of a pitch circle PC1.

An attachment hole portion 11 is disposed in the rotation center of the first gear 10, and a motor shaft 51 of a motor 50 is attached to the attachment hole portion 11. The attachment hole portion 11 and the mating motor shaft 51 are integrally joined in a manner not allowing for rotation relative to one another. This configuration causes the rotation of the motor 50 to rotate the first gear 10.

Second Gear 20

The second gear 20, as illustrated in FIGS. 1 and 2, is a spur gear and is made of resin such as polyoxymethylene (POM) also called polyacetal, for example. The second gear 20, as illustrated in FIG. 2, is a fan-type gear that includes tooth portions (projecting portions of the teeth) 20a only around a predetermined range of a pitch circle PC2.

An attachment hole portion 21 is disposed in the rotation center of the second gear 20, and a central shaft 70 projecting from an attachment base 30 is attached to the attachment hole portion 21. The attachment hole portion 21 and the central shaft 70 mate together in a manner allowing for rotation. This configuration allows the second gear 20 to rotate about the center of the attachment hole portion 21 (central shaft 70).

The first gear 10 and the second gear 20 have the same module for the tooth portions, and the distance between the central axes of the first gear 10 and second gear 20 is approximately the sum of $d_1/2$ (half the pitch circle diameter $d_1$) and $d_2/2$ (half the pitch circle diameter $d_2$), as illustrated in FIG. 2. This configuration allows the first gear 10 and the second gear 20 to mesh, as illustrated in FIGS. 1 and 2, and transmit torque.

The second gear 20 driven by the first gear 10 is provided with a drive pin 23 via which a drive target can be driven.

Guide Portion

As illustrated in FIG. 2, the first gear 10 and the second gear 20 are a fan-type gear. Thus, the first gear 10 and the second gear 20 need to be installed so that their respective specific teeth are paired in the rotation direction. Because of this, the first gear 10 and the second gear 20 are provided with a first guide portion 12 and a second guide portion 22, respectively. The guide portions 12, 22 facilitate the positioning of the first gear 10 and the second gear 20 in the gear rotation direction upon installation.

Figure 3:
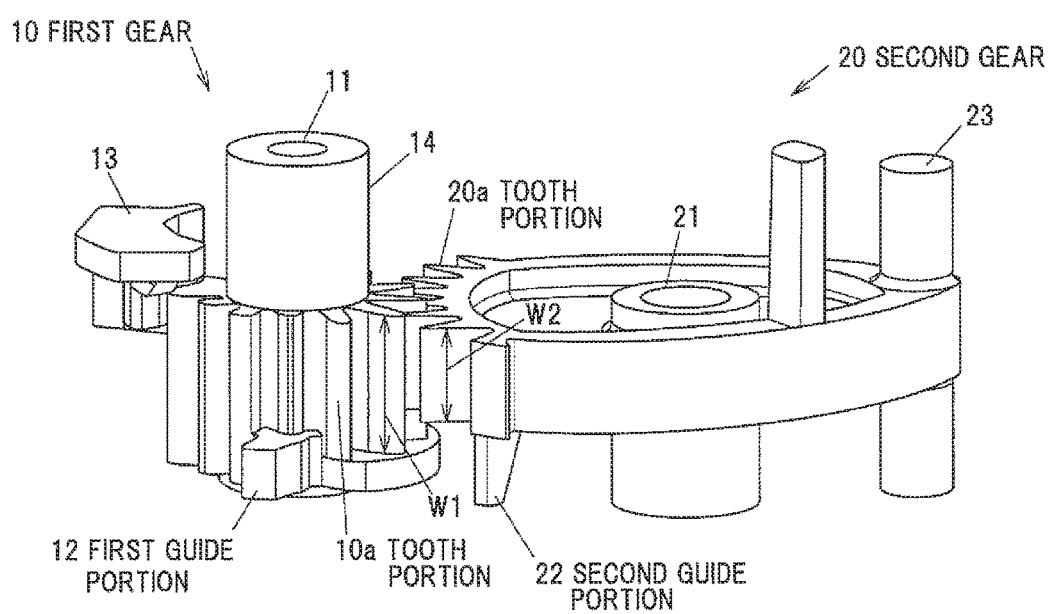
FIG. 3 is a three-dimensional perspective view illustrating the positions of respective guide portions of a first gear and a second gear.

FIG. 3 is a three-dimensional perspective view illustrating the positions of the respective guide portions (the first guide portion 12 and the second guide portion 22) of the first gear and the second gear.

As illustrated in FIG. 3, the first guide portion 12 of the first gear 10 is disposed separate from the tooth portions 10a of the first gear 10. In a similar manner, the second guide portion 22 of the second gear 20 is disposed separate from the tooth portions 20a of the second gear 20.

As illustrated in FIG. 3, the first guide portion 12 described above is disposed at a position spaced apart from the tooth portions 10a in the direction of tooth width W1. In a similar manner, the second guide portion 22 is disposed at a position spaced apart from the tooth portions 20a in the direction of tooth width W2. Accordingly, upon installation of the first gear 10 and the second gear 20, the first guide portion 12 and the second guide portion 22 come into contact with one another at a position spaced apart from the tooth portions 10a, 20a.

Additionally, as illustrated in FIGS. 2 and 3, the first guide portion 12 protrudes from a tooth tip 10b of the first gear 10. This configuration reliably prevents the tooth tips of the first gear 10 and the second gear 20 from coming into contact with one another upon installation.

Attachment Base 30

The attachment base 30, as illustrated in FIGS. 1 and 2, functions as the base of the unit constituted by the gear drive device 1 and supports the first gear 10 and the second gear 20 via the motor 50 and the central shaft 70. For example, stainless steel, treated steel, or the like is subjected to stamping to form the attachment base 30.

Torsion Spring 40

A coil portion 41 of the torsion spring 40, as illustrated in FIGS. 1 and 2, is attached to a boss portion 14 of the first gear 10 and applies a biasing force to the first gear 10 in a predetermined rotation direction (direction A). The torsion spring 40 is made of a spring steel, stainless steel for springs, or the like and includes arm portions 42, 43 extending from opposite ends of the coil portion 41.

As illustrated in FIG. 1, the arm portion 42, which is one of the arm portions of the torsion spring 40, is locked to a locking portion 61 of a block member 60 fixed to the attachment base 30. The other arm portion 43 is locked to a spring locking portion 13 which is a part of the first gear 10. This configuration biases the first gear 10 to rotate in the direction A.

Motor 50

The motor 50, as illustrated in FIGS. 1 and 2, is fixed to the attachment base 30 via screws 80, 81 with the motor shaft 51 protruding to the side on which the first gear 10 is located. Examples of motors that can be used for the motor 50 include a brush DC motor, a brushless DC motor, and the like.

Block Member 60

As illustrated in FIG. 1, the central shaft 70 is inserted in an attachment hole portion 62 and a leg portion 63 is locked in a notch portion 31 of the attachment base 30, resulting in the block member 60 being fixed to the attachment base 30. The block member 60 is made of resin or the like, for example. The block member 60 restricts movement of the second gear 20 in the axial direction of the central shaft 70, which prevents the second gear 20 from coming off the central shaft 70. Additionally, the block member 60, as described above, is provided with the locking portion 61 for locking the arm portion 42, which is one of the arm portions, of the torsion spring 40. This configuration allows the first gear 10 to be biased via the torsion spring 40 to rotate in the direction A from the attachment base 30 side.

Installation of First Gear 10 and Second Gear 20

Figure 4A:
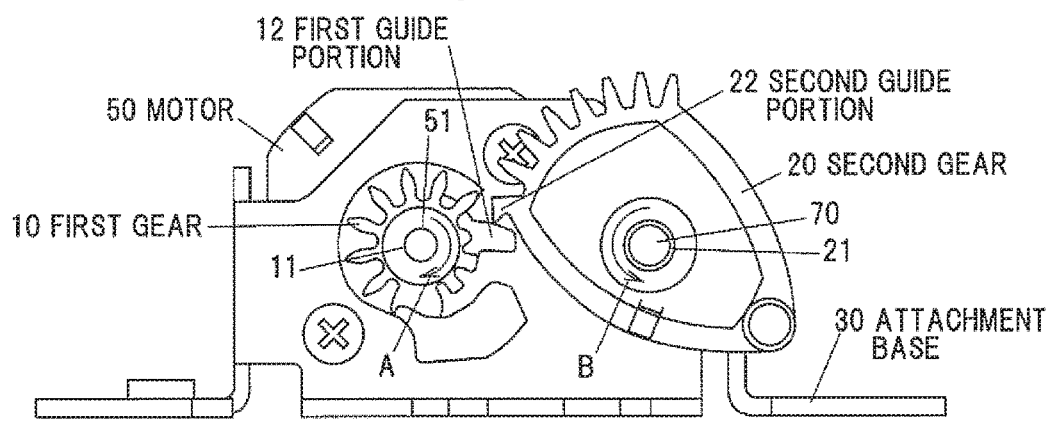
FIGS. 4A to 4C are diagrams illustrating the steps of installing the first gear and the second gear.
Figure 4B:
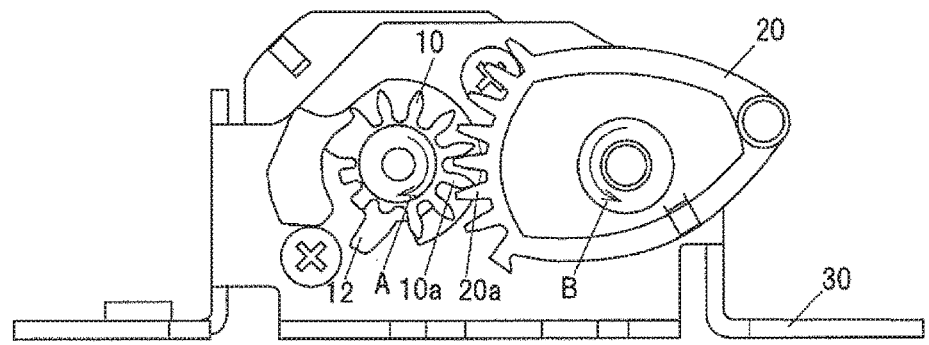
Figure 4C:
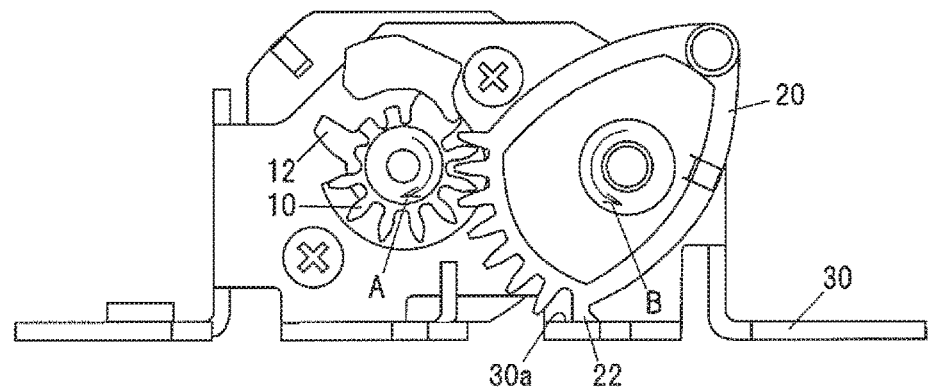

FIGS. 4A to 4C are diagrams illustrating the steps of installing the first gear and the second gear.

FIG. 4A illustrates a state in which the first gear 10 and the second gear 20 are placed at initial positions for installation on the motor 50 attached to the attachment base 30 and the central shaft 70 projecting from the attachment base 30, respectively. The attachment hole portion 11 of the first gear 10 is fitted on the motor shaft 51. Additionally, the attachment hole portion 21 of the second gear 20 is fitted on the central shaft 70. Note that in this state, the torsion spring 40 has yet to be mounted.

At the initial positions prior to installation of the first gear 10 and the second gear 20, as illustrated in FIG. 4A, the first guide portion 12 and the second guide portion 22 are in contact with one another. Note that the initial positions prior to installation of the first gear 10 and the second gear 20 may also be positions at which the first guide portion 12 and the second guide portion 22 are rotated opposite to the direction A and direction B illustrated in FIG. 4A, respectively, so as to be spaced apart from one another a predetermined distance.

FIG. 4B is a diagram illustrating a state in which rotating the second gear 20 in the direction B in the state illustrated in FIG. 4A brings the respective specific teeth of the first gear 10 and the second gear 20 in mesh and rotates the first gear 10 in the direction A. In other words, in the state illustrated in FIG. 4A in which the first guide portion 12 and the second guide portion 22 are in contact with one another, the respective specific teeth portions (10a and 20a) of the first gear 10 and the second gear 20 are brought in mesh and the first gear 10 rotates in the direction A following the rotation of the second gear 20 in the direction B.

FIG. 4C illustrates a state in which the second gear 20 rotates further in the direction B so that the second guide portion 22 comes into contact with a plate surface 30a of the attachment base 30. In other words, rotation of the first gear 10 and the second gear 20 is restricted at the positions illustrated in FIG. 4C.

As illustrated in FIGS. 1 and 2, the torsion spring 40 mounted to the first gear 10 biases the first gear 10 in the direction A. This makes the second gear 20 biased in the direction B. Accordingly, after installation in which the torsion spring 40 is mounted to the first gear 10, a state in which the second guide portion 22 is in contact with the plate surface 30a of the attachment base 30 is the post installation state.

The second guide portion 22 includes a positioning function to determine the initial position in the gear rotation direction of the first gear 10 or the second gear 20 after installation. Note that in another embodiment, the first guide portion 12 may include the positioning function to determine the initial position after installation.

Effect of Embodiments

A gear drive device according to embodiments of the present invention has the following effects.

(1) The gear drive device according to the present embodiment includes the fan-type first gear 10 and second gear 20. Thus, the first gear 10 and second gear 20 need to be installed so that their respective specific teeth are paired in the rotation direction. Because of this, the first gear 10 and the second gear 20 are provided with the first guide portion 12 and the second guide portion 22, respectively. The guide portions 12, 22 facilitate the positioning of the first gear 10 and the second gear 20 in the gear rotation direction upon installation. This configuration allows the first gear 10 and the second gear 20 to be installed with any teeth paired and without tooth tips coming into contact.

(2) The first guide portion 12, as illustrated in FIG. 3, is disposed at a position spaced apart from the tooth portions 10a in the direction of tooth width W1. In a similar manner as illustrated in FIG. 3, the second guide portion 22 is disposed at a position spaced apart from the tooth portions 20a in the direction of tooth width W2. Accordingly, upon installation of the first gear 10 and the second gear 20, the first guide portion 12 and the second guide portion 22 come into contact with one another at a position spaced apart from the tooth portions 10a, 20a. This configuration reliably prevents the tooth tips from coming into contact with one another upon installation.

(3) The first guide portion 12 protrudes from the tooth tip 10b of the first gear 10. This configuration reliably prevents the tooth tips of the first gear 10 and the second gear 20 from coming into contact with one another upon installation.

(4) Accordingly, in the configuration described above, cutting of the teeth due to contact between the tooth tips of the gears upon installation can be suppressed.

As made clear above, the invention according to the scope of the claims is not limited by the representative embodiments, modified examples, and illustrated examples according to the present invention described above. As such, it should be understood that all combinations of the features described in the embodiments, modified examples, and illustrated examples are not required parts of the means to solve the problem of the invention.

What is claimed is:

1. A gear drive device, comprising:
a first gear;
a second gear that meshes with the first gear to allow torque transmission; and
an attachment base,
wherein at least one of the first gear and the second gear comprises a fan-type gear, wherein the first gear and the second gear each comprise a guide portion,
wherein the guide portions are configured to pair respective teeth of the first gear and the second gear to intermesh without tooth tips contacting in a gear rotation direction upon installation thereof,
wherein the guide portion functions to determine an initial position in the gear rotation direction of the first gear and the second gear after the installation, and
wherein the initial position is determined by contacting the guide portion with a surface of the attachment base.

2. The gear drive device according to claim 1, wherein the guide portions are disposed separately from tooth portions of the first gear and the second gear.

3. The gear drive device according to claim 2, wherein the guide portions contact with one another at a position spaced apart from the tooth portion in a tooth width direction.

4. The gear drive device according to claim 1, wherein the guide portion of at least one of the first gear and the second gear protrudes from a tooth tip.

5. The gear drive device according to claim 1, further comprising a spring that is configured to bias the first gear or the second gear in the gear rotation direction, wherein the guide portion is contacted with the surface of the attachment base by a biasing force of the spring.

* * * * *